United States Patent
Liu

Patent Number: 6,138,068
Date of Patent: Oct. 24, 2000

[54] VEHICLE FOR AUTOMATICALLY ADJUSTING WINDOW AND SUNROOF POSITIONS AFTER IT BEING LEFT UNATTENDED BY ITS OPERATOR

[76] Inventor: Jonathan Liu, 20397 Via Napoli, Cupertino, Calif. 95014

[21] Appl. No.: 09/416,664

[22] Filed: Oct. 12, 1999

[51] Int. Cl.$^7$ ............................ B01F 3/02; G05D 23/00
[52] U.S. Cl. ........................... 701/49; 701/53; 701/36; 236/44 C; 374/132
[58] Field of Search ............................. 701/49, 53, 36, 701/65; 236/44 C; 374/132; 324/158.1

[56] References Cited

U.S. PATENT DOCUMENTS

| | | | |
|---|---|---|---|
| 4,776,179 | 10/1988 | Ta | 62/176.6 |
| 5,063,513 | 11/1991 | Shank et al. | |
| 5,544,809 | 8/1996 | Keating et al. | 236/44 C |
| 5,651,498 | 7/1997 | Meyer et al. | 236/44 C |
| 5,933,085 | 8/1999 | Holcomb et al. | 340/825.31 |

*Primary Examiner*—William A. Cuchlinski, Jr.
*Assistant Examiner*—Olga Hernandez
*Attorney, Agent, or Firm*—RJ Services

[57] ABSTRACT

Unless constantly protected by overhead garages, an automotive vehicle, when parked and with its windows and sunroof opened or closed, is often subjected, respectively, to the risk of freezing or overheating its interior. Such extreme temperatures will reduce the life span of the electronic and mechanical components in or near the vehicle interior. Also, excessively high and low temperatures in the interior of the car would clearly cause a rather discomforting experience for the driver and passengers who subsequently seat themselves in it. This experience is keenly amplified for young children, elderly and those who are physically weak because of their reduced tolerance to discomfort.

Briefly, a method and apparatus is provided for automatically adjusting a vehicle's window and sunroof positions after a vehicle operator has left a car unattended. The present invention includes a power window and sunroof system for an automotive vehicle. This system according to the present invention is activated only when the vehicle is presumably parked and left unattended by a vehicle operator. Once activated, the power window and sunroof system will be turned OFF automatically when the vehicle operator returns to drive the vehicle away.

The present invention also has a temperature sensing circuitry to be appropriately located somewhere in or near the interior of the vehicle. Once the system is activated, output of the temperature sensing circuitry would then be used to maintain a "comfortable" temperature range for the interior of the vehicle over the time period the vehicle is parked and left unattended.

20 Claims, 3 Drawing Sheets

VEHICLE FOR AUTOMATICALLY ADJUSTING WINDOW AND SUNROOF POSITIONS AFTER IT BEING LEFT UNATTENDED BY ITS OPERATOR

FIELD OF THE INVENTION

This invention has to do in general with a power window and sunroof system. More in particular, this invention is related to a control system for power windows and sunroof of an automotive vehicle. And even more specifically, this invention is directed to a control system of the vehicle having a temperature-dependent feature to be activated after the vehicle is parked and left unattended by a vehicle operator. Such feature also includes a lowering and raising of a power window and an opening and closing of a sunroof both to a pre-defined position to prevent the vehicle interior to become too hot or too cold. Among other things, this invention lengthens the operational life span of electronic and mechanical components near or in the vehicle interior, and it also reduces the risk of harm to pets, toddlers and infants who are occasionally left unattended inside the vehicle.

BACKGROUND INFORMATION

Unless constantly protected by overhead garages, an automotive vehicle, when parked and with its windows and sunroof closed, is often subjected to the risk of overheating its interior. This overheating risk is particularly elevated in summers and in low-latitude regions of the world. For example, in a typical California summer day, the temperature of the interior of a car that has its windows and sunroof closed and parked under the direct sun may easily exceed 40° C. In regions close to the Equator, interiors of cars sometimes are recorded to exceed 60° C. under similar circumstances. Similarly, interiors of unattended cars may be too cold for comfort for people in early mornings when the windows and/or sunroofs were left opened for heat ventilation the day before. Again, this is a fairly usual circumstance for car owners in a typical California summer day that may reach 30° C. during the day and may drop to 10° C. at night.

For the electronic and mechanical components in or near the interior of a car, such high and low temperatures will reduce their operational life span. Also, excessively high and low temperatures in the interior of the car would clearly cause a discomforting or rather, a painful experience for the driver and passengers who subsequently seat themselves in it. This experience is keenly amplified for young children, elderly and those who are physically weak because of their reduced tolerance to discomfort. The discomfort and pain are especially unbearable for bare hands and legs that make contact with the metallic, vinyl, plastic and leather parts of the car interior.

One common solution to prevent overheating the interior is to roll down the car windows before leaving the car. For security reasons, the windows are typically lowered to a position so that air ventilation may be effective in lowering the interior temperatures but not too low a position so that burglars may easily gain access to the car. For some cars, alarm is provided to detect any irregular car access attempts. For hand-cranked window systems, a car driver typically removes the key from the ignition cylinder, cranks the window down to a satisfactory position and then leaves the car. For power window systems, they are usually advantageous over any hand-cranked systems in the areas of effort, speed and convenience. However, these window systems typically are not operable unless an ignition key cylinder is turned to ACCESSARY or ON position by an ignition key. Therefore, for such systems, the car driver has to make adjustment to the window position before turning the ignition key cylinder to OFF position and before removing the key from the ignition cylinder.

Other power window systems allow the car driver to remove the key from the ignition key cylinder first, and then regardless of the vehicle interior temperature, they immediately and automatically raise or lower car windows to desired positions for the purpose of preventing the overheating of the car interior. Unfortunately, these systems remove the flexibility desired by the car driver by assuming that the driver is leaving the car once the ignition key is removed. Even in the case that the driver does leave, moving the car windows to a fixed position regardless of vehicle interior temperature may harm toddlers and pets the driver leaves unattended. As an improvement, another system provides a sensor in the vehicle to detect presence of living beings. However, such sensor simply detects presence of living beings, but it does not attempt to distinguish the car driver from others who may be potentially incapacitated living beings. Advantageously, one embodiment of the present invention does attempt to make that distinction. That is, if the car driver is present in the car after the key is removed from the ignition cylinder, the present invention remains inactivated whereby affording the maximum flexibility to the car driver;

Although these systems do address the above-stated problems, they however, are partial solutions, and they do not take into account the variability of temperature in the car interior as the car is parked over a time period. For example, a car driver drives to work in the morning. The chilly morning makes his car interior cold. At the time of leaving the car, to prevent the ill effects of the coldness on electronic and mechanical components, the driver should not lower the windows and should not open the sunroof for ventilation. However, as the sun rises, it heats up the car interior and now the windows should be lowered and the sunroof should be opened appropriately to prevent overheating the car interior. In the late afternoon, tree shades over the parked car allow the car interior to have comfortable temperatures and the windows and the sunroof should then be closed for security reasons. However, it may be preferred that the windows and the sunroof are not closed until the vehicle interior temperature has dropped below a temperature threshold. These desired automatic window and sunroof adjustments occurring while the driver is away are not provided by any existing and prior art.

Therefore, it is desirable to have a power window and sunroof system for automotive vehicles. This system is operative while the vehicle is left unattended. It intelligently controls the window and sunroof positions of the vehicle for ventilation to prevent the vehicle interior to become too hot or too cold.

SUMMARY OF THE INVENTION

Briefly, a method and apparatus is provided for automatically adjusting a vehicle's window and sunroof positions after the vehicle's ignition is turned off. The present invention includes a power window and sunroof system for an automotive vehicle. This system according to the present invention is activated when the vehicle is presumably parked and left unattended by a vehicle operator. One set of technical indications for such circumstance includes an ignition switch OFF/key removed signal, a subsequent driver door OPENED and CLOSED signals. Other preferred embodiments may further include a door LOCKED signal. One aspect of the invention is directed to the detection of actions by the vehicle operator as input for system activation and de-activation, for example, the operator removes the ignition key, opens the driver door, closes the driver door and locks the door. Advantageously, if the vehicle operator stays in the vehicle after the key is removed from the ignition cylinder, the present invention remains inactivated whereby affording the maximum flexibility to the car driver.

Once activated, the power window and sunroof system will be disabled automatically when the vehicle operator returns to drive the vehicle away. In that case, a set of technical indications includes a driver door OPENED signal, a driver door CLOSED signal and a subsequent ignition switch ON signal. Also, one feature of the present invention allows the vehicle operator to manually inactivate the system.

The present invention also has a temperature sensing circuitry to be appropriately located somewhere in or near the interior of the vehicle. Once the system is activated by the set of technical indications, output of the temperature sensing circuitry would then be used to control the window and sunroof positions of the vehicle for ventilation to prevent the vehicle interior to become too hot or too cold. One preferred embodiment maintains a "comfortable" temperature range for the interior of the vehicle over the time period the vehicle is parked and left unattended. It is therefore reasonable to desire having the "comfortable" temperature range maintained for as long as possible. In this embodiment, the windows and the sunroof are moved to the CLOSED positions if the interior temperature drops below the low side of the range, and they are moved pre-defined OPENED positions if the interior temperature exceeds the high side of the range. If the temperature falls within the range, then they may be optionally be moved to either the OPENED or CLOSED positions depending on manufacturing preference.

One aspect of the present invention discloses that the "comfortable" temperature range, window and sunroof ventilation positions are to be determined and fixed at the time of manufacture. Another aspect preferably includes a control panel in the vehicle interior for the operator setting of the temperature range, the window and sunroof ventilation positions.

BRIEF DESCRIPTION OF THE DRAWINGS

A better understanding of the present invention can be obtained by considering the following detailed description taken together with the accompanying drawings that illustrate preferred embodiments of the present invention in which.

DETAILED DESCRIPTION OF THE PREFERRED EMBODIMENTS

With today's advances in technology, the design of specialized integrated circuits and programmable logic generally do not require the rendering of fully detailed circuit diagrams. The definition of logic functionality allows computer design techniques to design the desired logic and circuits. Additionally, vehicle micro-controllers are known to operate based on a desired flow chart diagram rendered into software. Accordingly, portions of the present invention will be described primarily in terms of functionality to be implemented by a vehicle micro-controller and other associated electronic components. This functionality will be described in detail with the associated flow chart diagram. Those of ordinary skill in the art, once given the following descriptions of the various functions to be carried out by the present invention will be able to implement the necessary micro-controller structure and logic for various logic devices or custom designed integrated circuits in suitable technologies without undue experimentation.

Figure 1:
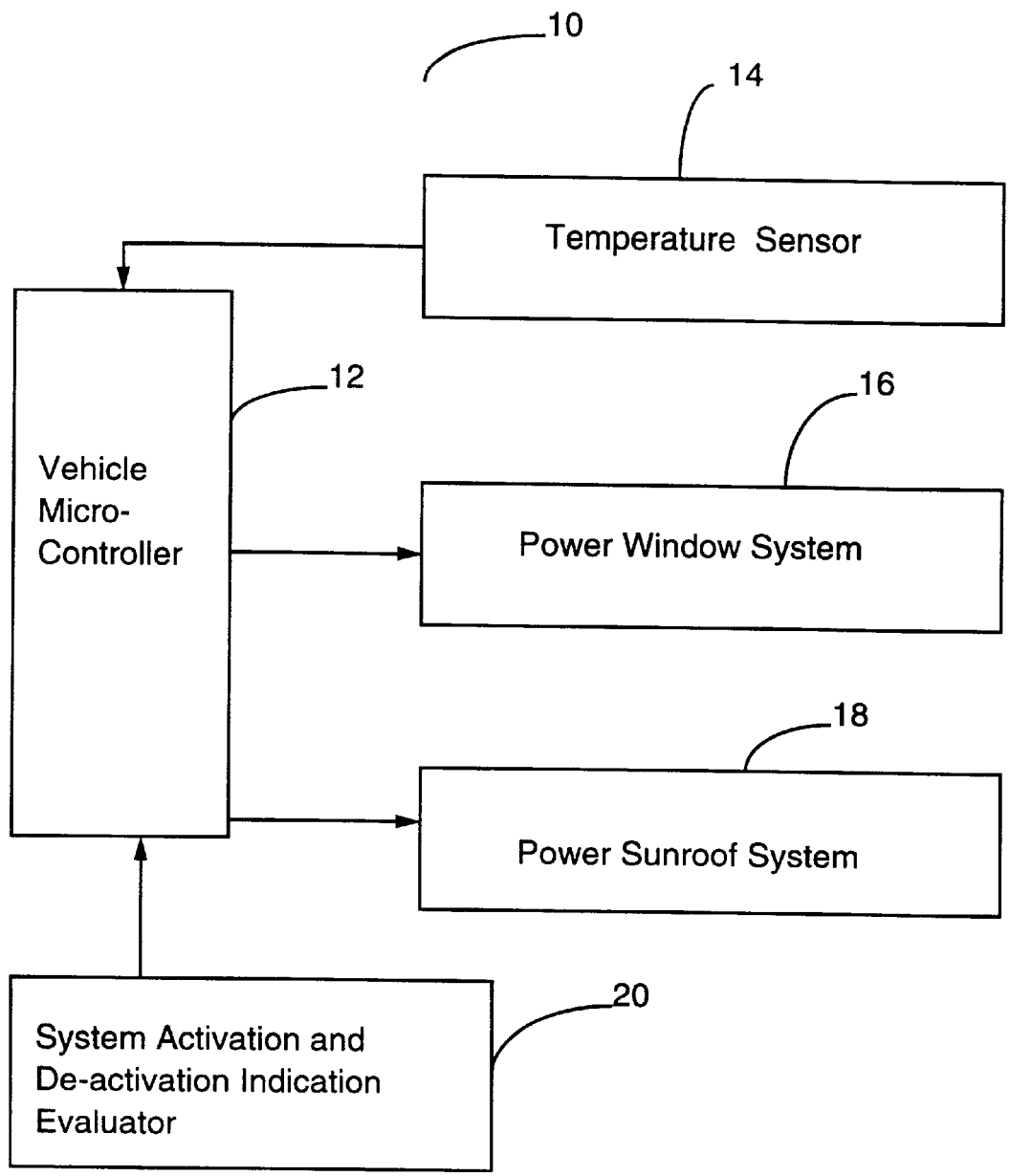
FIG. 1 shows a simplified functional diagram including a vehicle micro-controller in accordance with the present invention.

Automatic power window and power sunroof systems are commonplace in automotive vehicles today and the mechanisms for enabling such systems are also well known. However, these systems are typically operative only when the ignition key for a vehicle is inserted and hand-turned in the ignition cylinder to either the ACCESSARY, ON or START position. FIG. 1 in accordance with the present invention shows a simplified functional diagram 10 illustrating a vehicle micro-controller 12. Once the present invention is activated by a set of technical indications as required by an activation evaluator 20, this micro-controller 12 receives temperature information of a vehicle interior from a temperature sensor 14 and sends appropriate commands to a power window system 16 and/or a power sunroof system 18 in response to the received temperature information. However, after the system is de-activated by another set of technical indications as evaluated by the de-activation evaluator 20, the micro-controller 12 ceases to access the temperature sensor 14 for the temperature information of the vehicle interior. Preferably for the present invention, the set of technical indications required for activation and deactivation are directed to detect direct actions by the vehicle operator. In this manner, the micro-controller 12 would have then be able to rule out the vehicle operator as one of the potential incapacitated living beings. In other words, the present invention should not be activated and the control over the vents should continue to be afforded to the vehicle driver if the driver remains inside the vehicle after the key removal from the ignition cylinder. The power mechanisms for the power window system 16 and the sunroof system 18 are typical and well known, and engineers in the arts may readily design an interface for use between the systems 16,18 and the vehicle micro-controller 12 of the present invention without undue experimentation.

Figure 2:
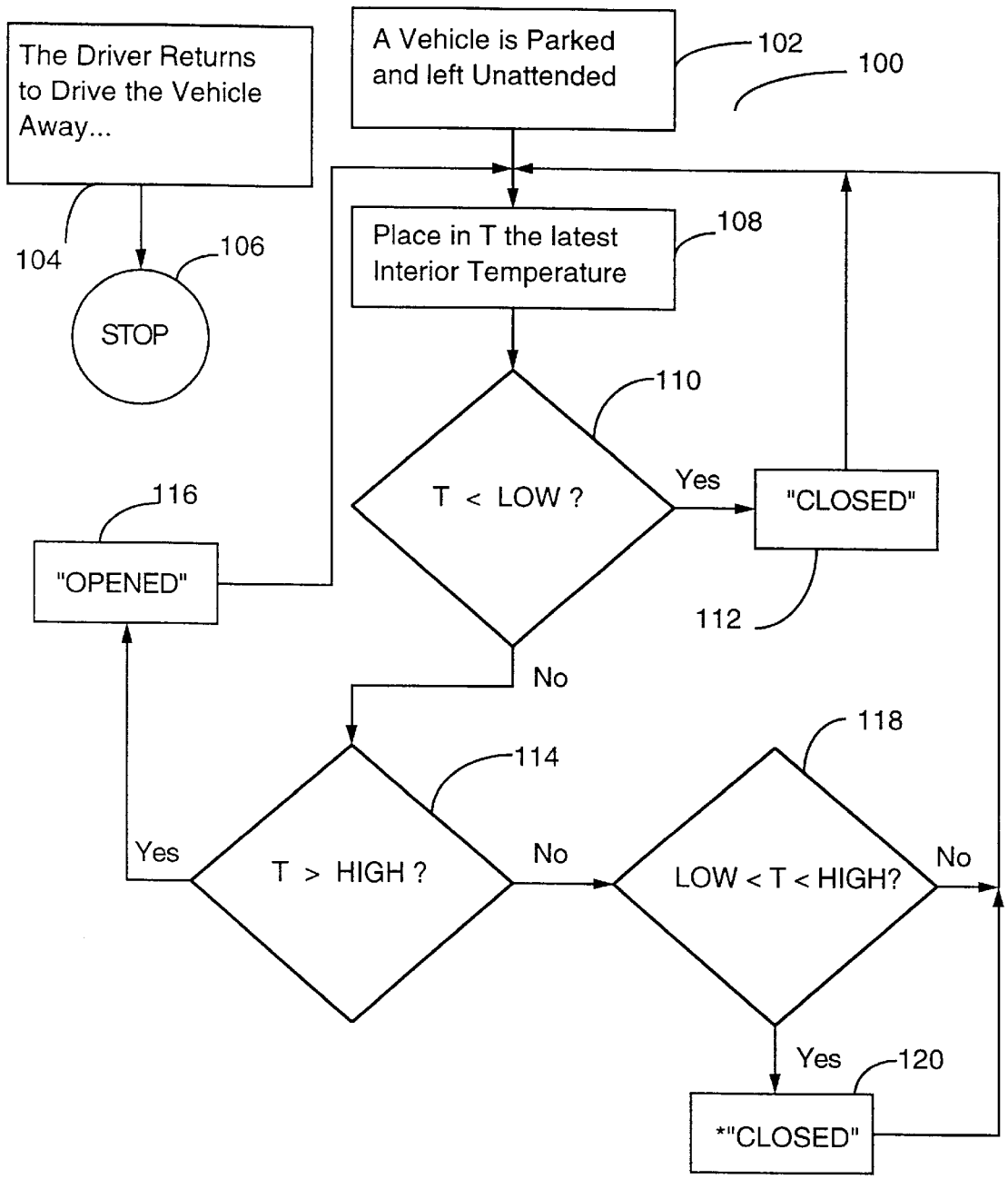
FIG. 2 illustrates a general operating flowchart for a control routine of a preferred embodiment for controlling power window and sunroof positions of an automotive vehicle after the vehicle is parked and a vehicle operator has left it unattended.

Now, referring to FIG. 2 in conjunction with FIG. 1, FIG. 2 shows a general operating flowchart for a control routine 100 of a preferred embodiment for controlling power window and sunroof positions of a vehicle after the vehicle is parked and a vehicle operator has left it unattended. Since the power mechanisms for the windows and the sunroof are typically implemented independent and separate from each other, therefore, the flowchart in FIG. 2 could be applicable to either a power window system or a power sunroof system or both systems in combination.

The present invention the control routine 100 in FIG. 2 is activated in step 102 when the vehicle is parked and left unattended by a vehicle operator. For implementations, different sets of indicators may be used to presume such circumstance. In one preferred embodiment, the indicators required for the activation evaluator 20 for may include an ignition switch OFF and an ignition key removed signal. In addition to these signals, other preferred embodiments may use a driver door OPENED signal and a subsequent driver door CLOSED signal to better indicate to the present invention that the vehicle operator has parked and subsequently left the vehicle. Yet another embodiment may require a door LOCKED signal before the present invention is activated in step 102 by the activation evaluator 20. The occurrence sequence of these signal may vary, for example, a driver door OPENED signal may occur either before or after the key removal signal; however, the door LOCKED signal has to occur after the driver door OPENED and CLOSED signals. These signals are known and typical to a modem vehicle, and the electronics for activating the present invention requires no more than several discrete logic gates; however, in practice, it may also be implemented in hardware or firmware in the vehicle micro-controller system 12. As an example, this control routine 100 may be operating as a part of the vehicle's overall control system and under the control of the vehicle's micro-controller system 12. In that case, the activation step 102 may be initiated either by polling or via the interrupt method as directed by the vehicle micro-controller 12.

The present invention is deactivated in steps 104,106 when the vehicle operator returns and drives the vehicle away. Again, for implementations, different sets of indicators may be used to presume such circumstance. In one preferred embodiment, the indicators required for the de-activation evaluator 20 may include a driver door OPENED signal, a driver door CLOSED signal and a subsequent ignition switch ON signal. Although the occurrence sequence may again vary, regardless, these signals in combination presumes the return of the vehicle operator, the operator's inserting the ignition key into the ignition cylinder and the operator's turning the ignition cylinder to ON position to drive the vehicle away. In other embodiments, these signals may be required to occur within a pre-determined time duration, for example, all three signals must occur within an one-minute duration. Again, the deactivation steps 104,106 to be executed in the de-activation evaluator 20 may be implemented via polling or interrupt methodologies. If the control routine 100 is a part of a larger program, then step 106 would cause the control to be transferred back to its (100's) calling function. Furthermore, a manual switch may be provided for the vehicle operator to bypass the present invention, in other words, the manual switch is able to prevent the present invention to be activated when the vehicle is parked and left unattended by the vehicle operator.

The present invention also has a temperature sensing circuitry 14 to be appropriately located somewhere in or near the interior of the vehicle. Once the system is activated by a set of technical indications, output of the temperature sensing circuitry 14 would then be used to control the window and sunroof positions of the vehicle for ventilation to prevent the vehicle interior to become too hot or too cold. For example, once the present invention is activated, step 108 of FIG. 2 indicates that temperature readings generated by the temperature sensing circuitry 14 are accessed and saved into a register T by the vehicle micro-controller 12.

Figure 3:
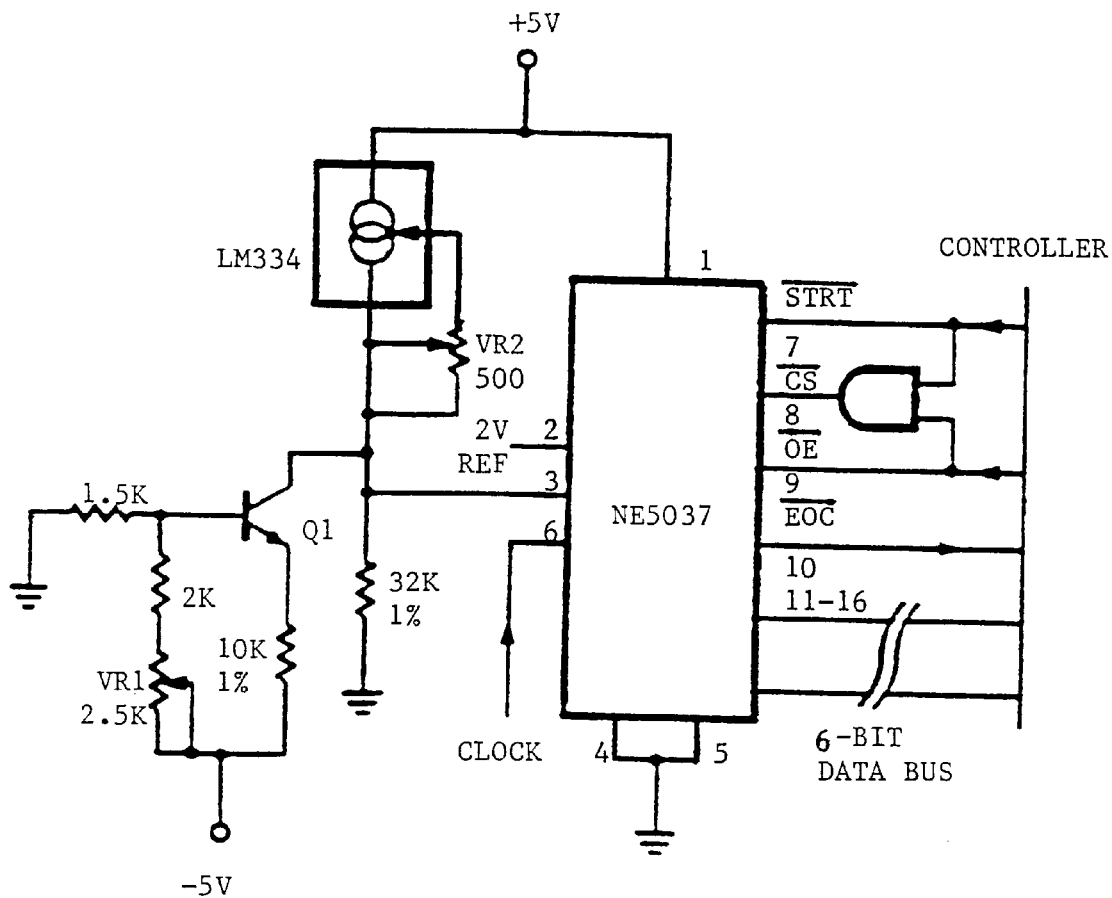
FIG. 3 illustrates a typical temperature sensor suitable for use in a preferred embodiment in accordance with the present invention.

Numerous temperature-sensing circuits are available for use as the temperature sensor 14 operative in connection with the micro-controller 12. FIG. 3 illustrates such a typical temperature sensor 200 suitable for use in the present invention. Briefly, LM334 is a three-terminal temperature sensor and provides a current of 1 microamp for each degree Celsius. The 32 Kohm resistor below the LM334 generates 32 mV for each microamp going through it, and that generated voltage is fed into an analog to digital temperature converter, NE5037. NE5037 converts the analog temperature information into the digital format manageable by the vehicle micro-controller 12 (shown in FIG. 1). In order to read temperature, the micro-controller 12 may initiate the conversion process in NE5037 by sending a momentary low signal to pin 7 of the NE5037. When pin 10 of the NE5037 becomes low, conversion is complete and a low is then applied to pin 9 of the NE5037 to read data on pins 11 and through 16. This temperature sensor is arranged to read temperatures ranging from 0° to 63° Celsius; it 200 can be readily re-arranged to detect a different range of sixty-four degrees. We can also replace NE5037 with another converter to increase or decrease the span of the temperature range.

Again referring to FIG. 1 and FIG. 2, one preferred embodiment maintains a "comfortable" temperature range for the interior of the vehicle over the time period the vehicle is parked and left unattended. A preferred "comfortable" temperature range is 20° to 25° C. That is, after activation, on the one hand, the windows and the sunroof are powered and moved to the CLOSED positions if the interior temperature drops below 20° as shown in steps 110,112. On the other hand, they are moved to pre-defined OPENED positions if the interior temperature exceeds 25° C. as shown in steps 114,116. As mentioned earlier, the windows are typically lowered to a position so that air ventilation may be effective in lowering the interior temperatures but not too low a position so that burglars may easily gain access to the car. In one case, limit switches in the systems 16,18 may be appropriately placed to allow a 10 millimeter opening in the OPENED position.

If the temperature falls within the "comfortable" range, then the windows and the sunroof may be optionally be moved to either the OPENED or CLOSED positions. Step 118 and 120 indicate that they will be closed; however, the asterisk in step 120 indicates that it is also optional for the manufacturers to set them to OPENED positions given the same circumstance. Furthermore, vehicle interior temperature variability needs are different depending on geography. For example, the control routine 100 works well for vehicles in California. However, for vehicles in Alaska where the concern is primarily to prevent the vehicle interior to become too cold, steps 114,116 would then be unnecessary. In that case, the No line from step 110 would then go directly to step 118. Similarly, for vehicles in Colombia where the concern is just the opposite, then steps 110,112 would be unnecessary and that step 108 would then go directly to step 114. The "comfortable" temperature range, window and sunroof ventilation positions are preferably determined and fixed at the time of manufacture; however, it is within the contemplation of the present invention that these parameters may be customized by vehicle operators through a control panel located in the vehicle interior.

The foregoing description of preferred embodiments of the present invention have been presented for purposes of illustration and description. They are not intended to be exhaustive or to limit the invention to the precise forms disclosed, and obviously many modifications and variations are possible in light of the above teaching. It is intended that the scope of the invention be defined by the claims appended hereto and their equivalents.

I claim:

1. A method for intelligently controlling the temperature of a vehicle after the vehicle is parked and left unattended; the method comprising the steps of:

Coupling a vehicle micro-controller being located in the automotive vehicle and having access to a pre-defined temperature range which including a high value and a low value to an activation and de-activation evaluator, a temperature sensing circuit, and a power window system;

Detecting first by the activation and de-activation evaluator the vehicle being parked and left unattended by a vehicle operator, the first detecting step further including informing the vehicle micro-controller for activating said temperature-dependent system;

Detecting second by the activation and de-activation evaluator the vehicle operator returning to drive the vehicle away, the second detecting step further including informing the vehicle micro-controller for de-activating said temperature-dependent system;

Providing by a temperature sensing circuit a temperature reading of the vehicle interior in response to an access by the vehicle micro-controller; and Directing by the vehicle micro-controller to cause the power window system to move its window panes to CLOSED positions if the temperature reading falling below the low value of the temperature range, the directing step further including causing the power window system to move its window panes to pre-defined OPENED positions if the temperature reading exceeding the high value of the temperature range.

2. An automotive vehicle having a temperature-dependent system for intelligently controlling the temperature of a vehicle interior after the vehicle being left unattended by a vehicle operator, said temperature-dependent system comprising:

a vehicle micro-controller located in the automotive vehicle and said vehicle micro-controller being operatively coupled to an activation and de-activation evaluator, a temperature sensing circuit, a power window system and a power sunroof system, said micro-controller having access to a pre-defined temperature range which having a high value and a low value;

the activation and de-activation evaluator including electronics to first detect the vehicle being parked and left unattended by a vehicle operator by requiring occurrences of an ignition key removed signal, a driver door OPENED signal and a subsequent driver door CLOSED signal, said evaluator further informing the vehicle micro-controller in response to such first detection for activating said temperature-dependent system, said activation and de-activation evaluator further including electronics to second detect the vehicle operator returning to drive the vehicle away, said evaluator further informing the vehicle micro-controller in response to such second detection for de-activating said temperature-dependent system;

the temperature sensing circuit located in the vehicle for providing a temperature reading of the vehicle interior in response to an access by the vehicle micro-controller;

the vehicle micro-controller being responsive to the temperature reading being in between the first high value and the first low value by directing the power window and power sunroof systems to maintain the temperature reading to be within the first temperature range over the time period the vehicle is parked and left unattended; and the vehicle micro-controller causing the power window and the power sunroof systems to move their parts to CLOSED positions if the temperature reading falling below the low value of the temperature range, the micro-controller causing the power window and the power sunroof systems to move their parts to pre-defined OPENED positions if the temperature reading exceeding the high value of the temperature range.

3. The temperature-dependent system as claimed in claim 2 wherein the evaluator for the first detection of the vehicle being parked and left unattended by the vehicle operator further requires a door LOCKED signal and all signals occurring within a pre-determined duration.

4. The temperature-dependent system as claimed in claim 2 wherein the evaluator for the second detection of the vehicle operator returning to drive the vehicle away requires for system de-activation a driver door OPENED signal, a driver door CLOSED signal and a subsequent ignition switch ON signal, and all signals occurring within a one-minute duration.

5. The temperature-dependent system as claimed in claim 1 further includes a manual switch configured for the vehicle operator to bypass temperature-dependent system, and wherein the vehicle micro-controller causes the power window and the power sunroof systems to move their parts to the CLOSED positions if the temperature reading falling within the pre-defined temperature range.

6. The temperature-dependent system as claimed in claim 2 wherein the vehicle micro-controller causes the power window and the power sunroof systems to move their parts to the pre-defined OPENED positions if the temperature reading falling within the pre-defined temperature range, and one of the pre-defined OPENED positions providing a generally 10 millimeter opening for the power window and the power sunroof systems.

7. An automotive vehicle having a temperature-dependent system for intelligently controlling the temperature of a vehicle interior after the vehicle is parked and left unattended said temperature-dependent system comprising:

a vehicle micro-controller located in the automotive vehicle and said vehicle micro-controller being operatively coupled to an activation and de-activation evaluator, a temperature sensing circuit, and a power window system, said micro-controller having access to a pre-defined temperature range which having a high value and a low value;

the activation and de-activation evaluator including electronics to first detect the vehicle being parked and left unattended by a vehicle operator, said evaluator further informing the vehicle micro-controller in response to such first detection for activating said temperature-dependent system, said activation and de-activation evaluator further including electronics to second detect the vehicle operator returning to drive the vehicle away, said evaluator further informing the vehicle micro-controller in response to such second detection for de-activating said temperature-dependent system;

the temperature sensing circuit located in the vehicle for providing a temperature reading of the vehicle interior in response to an access by the vehicle micro-controller; and the vehicle micro-controller causing the power window system to move its window panes to CLOSED positions if the temperature reading falling below the low value of the temperature range, the micro-controller causing the power window system to move its window panes to pre-defined OPENED positions if the temperature reading exceeding the high value of the temperature range.

8. The temperature-dependent system as claimed in claim 7 wherein the evaluator for system de-activation requires an ignition switch ON signal.

9. The temperature-dependent system as claimed in claim 7 wherein the power window system includes a power sunroof system.

10. The temperature-dependent system as claimed in claim 7 wherein the vehicle micro-controller causes the power window system to move its window panes to the pre-defined OPENED positions if the temperature reading falling within the pre-defined temperature range.

11. The temperature-dependent system as claimed in claim 7 wherein the vehicle micro-controller causes the power window system to move its window panes to the CLOSED positions if the temperature reading falling within the pre-defined temperature range.

12. The temperature-dependent system as claimed in claim 7 wherein the evaluator for system de-activation includes a manual de-activation switch to be operated by the vehicle operator.

13. The temperature-dependent system as claimed in claim 7 wherein the high value of the temperature range is 25° C., and the low value of the temperature range is 20° C.

14. The temperature-dependent system as claimed in claim 7 wherein the pre-defined temperature range may be adjusted by the vehicle operator using a control panel located in the vehicle interior.

15. The temperature-dependent system as claimed in claim 7 wherein the evaluator for system de-activation requires a driver door OPENED signal, a driver door CLOSED signal and a subsequent ignition switch ON signal.

16. The temperature-dependent system as claimed in claim 15 wherein the driver door OPENED signal, the driver door CLOSED signal and the subsequent ignition switch ON signal occur within a pre-determined duration.

17. The temperature-dependent system as claimed in claim 7 wherein the evaluator for system activation requires an ignition key removed signal.

18. The temperature-dependent system as claimed in claim 17 wherein the evaluator for system activation further requires a driver door OPENED signal and a subsequent driver door CLOSED signal.

19. The temperature-dependent system as claimed in claim 17 wherein the occurrence timing of the ignition key removed signal and the driver door OPENED signal is irrelevant.

20. The temperature-dependent system as claimed in claim 18 wherein the evaluator for system activation further requires a door LOCKED signal.

* * * * *